(No Model.)
J. F. STUCKERT.
ALARM.
No. 387,265. Patented Aug. 7, 1888.
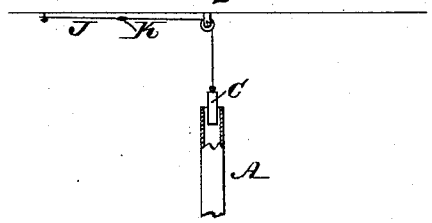
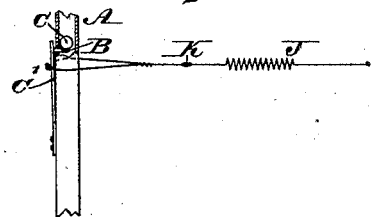
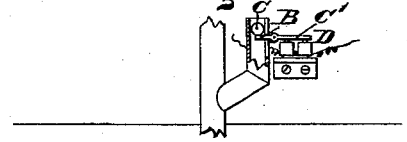
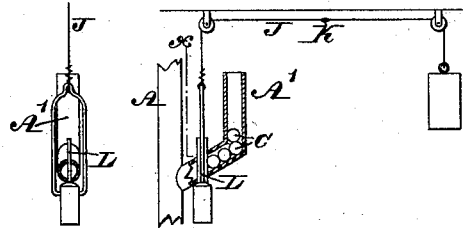
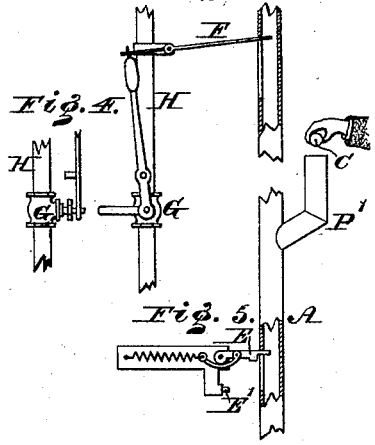
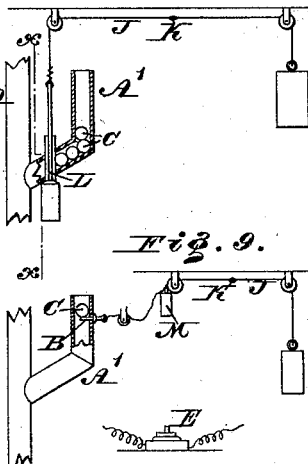
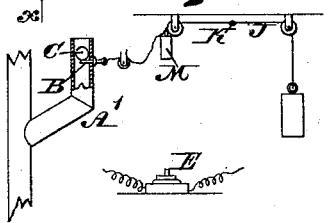
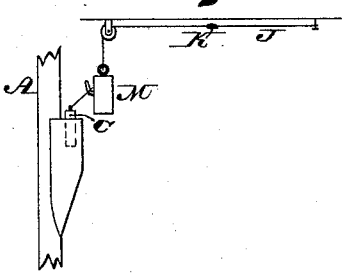
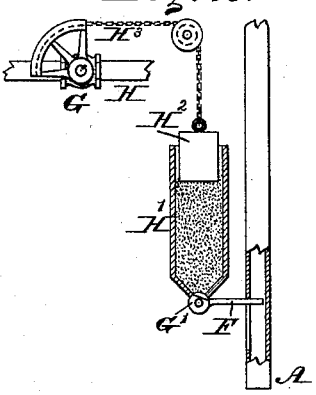
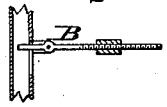
WITNESSES:
A. P. Grant,
L. Douville.
INVENTOR:
J. Franklin Stuckert
BY John A. Wiederschein
ATTORNEY.

United States Patent Office.

J. FRANKLIN STUCKERT, OF PHILADELPHIA, PENNSYLVANIA.

ALARM.

SPECIFICATION forming part of Letters Patent No. 387,265, dated August 7, 1888.

Application filed September 27, 1886. Serial No. 214,654. (No model.)

*To all whom it may concern:*

Be it known that I, J. FRANKLIN STUCKERT, a citizen of the United States, residing in the city and county of Philadelphia, State of Pennsylvania, have invented a new and useful Improvement in Alarms, which improvement is fully set forth in the following specification and accompanying drawings, in which—

Figure 1 represents a view of a fusible cord, weight, and tube as employed by me in my invention. Fig. 2 represents a view of the invention wherein the ball or weight is sustained in a tube by an inserted arm, the latter being connected to the armature of an electric magnet. Fig. 3 represents the inserted arm as connected to the cock of a water-pipe. Fig. 4 is a view of part of Fig. 3 at right angles thereto. Fig. 5 represents the tube with side tube and a spring-trigger operated by contact with the falling weight or ball and adapted to be brought into contact with a nipple. Fig. 6 represents a spring connected to the inserted arm of the tube and held in place by a fusible wire. Fig. 7 represents the side tube containing the balls provided with a weighted valve, the latter held in place by a fusible cord. Fig. 8 is a vertical view on line $x\,x$, Fig. 7. Fig. 9 represents the inserted arm of the side tube as adapted to be operated by a weight, which latter is sustained by another weight connected thereto by a fusible wire or cord. An electric button adapted to complete a circuit is also shown in position to be operated by a descending weight. Fig. 10 represents the weight or ball as sustained in the side tube by means of a second weight having an arm or hook and suspended by a fusible cord. Fig. 11 shows the inserted arm as having an adjustable counterpoise, so as to sustain one or more balls in the tube. Fig. 12 shows a spring entering the tube for the purpose of sustaining the balls therein. Fig. 13 represents the inserted arm as adapted to operate a valve which controls the contents of a reservoir, the said contents sustaining a weight adapted to operate the valve of a water-pipe. An electric button is shown in this figure in line of the tube and falling ball, so as to be operated thereby. Fig. 14 represents the valve of the receptacle as adapted to be controlled by the armature of an electro-magnet.

Similar letters of reference indicate corresponding parts in the several figures.

My invention consists of a tube or conveyer, which is adapted to receive a ball or weight, and means for temporarily retaining the latter, whereby, in the event of fire, &c., the ball or weight is released and caused to operate an alarm, and water may also be turned on, as will be hereinafter set forth.

Referring to the drawings, A represents a tube, which extends from an apartment or room in one story or floor to an apartment or room in another story or floor below the same, and B represents an arm which projects into the tube and is adapted for holding a ball or weight, C.

In Fig. 2 the arm is connected with an armature, $c'$, of an electro-magnet, D, the wires whereof are run into an apartment so that in the event of fire the wires are burned, the electric circuit is broken, and the armature is released, it being seen that as the ball or weight rests on the portion of the arm within the tube the arm lowers and the ball drops, whereby it reaches an alarm and strikes the same and causes it to be sounded.

At the bottom of Fig. 13 is shown an electric button, E, which, when struck by the ball, closes the circuit so that a bell or alarm connected with the wires will be sounded.

The alarm, which may be a bell or gong or other suitable instrument of any well-known form or construction, is not shown in the drawings, as the same is not claimed by itself.

In Fig. 3 is shown an arm, F, which projects into the tube and is connected with the cock G of a water-pipe, H, the latter opening into an apartment so that when a ball or weight leaves the arm B it strikes said arm F and causes the cock G to be opened, whereby the water is turned on and directed into the apartment where fire exists.

In Fig. 5 a spring-pressed trigger, E, projects into the tube A and is employed in lieu of the button shown at the base of Fig. 13, and a nipple, E', is located adjacent to said trigger and is adapted to carry a cap or cartridge, so that as the descending ball strikes said trigger the latter is released, and owing to its spring is forced against the nipple E', thus snapping the cap or exploding the cartridge, an alarm thus being sounded.

In Fig. 13 an arm, F, projects into the tube and is connected with a cock, G', at the lower end of a vessel, H', containing sand or other material capable of sustaining a weight, $H^2$, the latter being connected by a chain, $H^3$, with the cock G of a water-pipe, H, so that when the arm F is struck by the descending ball or weight it lowers, opens the cock G', and permits the sand or material in the vessel H' to escape, whereby the weight $H^2$ descends and the cock G is accordingly opened, whereby water is turned on and so enters the apartment.

In Fig. 6 the detaining-arm B is connected by an elastic strip, C', and a spring or elastic cord, J, in the length of which is fusible material K, which, in the event of fire, fuses or melts, thus causing a separation of the spring or cord J, whereby the strip C' flies outwardly and carries with it the arm B, thus permitting the ball or weight to drop and operate the alarm, &c.

In Fig. 7 the tube A has a branch, A', in which is a valve, L, the latter depending from a cord, J, in the length of which is fusible material. A weight is attached to the cord and serves to hold the valve in closed position. In the event of fire, the cord separates owing to the fusible material and the valve drops and opens, and thus the balls or weights are liberated and so drop, operating the alarm, &c.

In Fig. 9 the arm B in the branch A' is connected with a cord, J, formed partly or entirely of fusible material, having a weight at one end, and a weight, M, between its ends, the cord passing over suitable pulleys, so that when the cord J separates, due to melting, in the event of fire, the weight M drops and draws out the arm B, thus releasing the ball or weight.

In Fig. 1 a weight, C, is shown suspended from a cord, J, formed partly or entirely of fusible material, so that said weight is permitted to drop when the cord separates, due to fire, and so enters the tube, being thereby directed to the alarm &c.

In Fig. 10 a weight, C, is attached to a weight, M, by means of a hook on the latter, said weight depending from a cord, partly or entirely of fusible material, so that as the weight M drops, the weight C is stripped from the hook thereon, and thus said weight falls through the tube and releases the alarm, &c.

In Fig. 11 I provide the arm with a weight, whereby said arm may be adjusted to be tripped or lowered by one or more balls or weights, according to requirements. The same result is accomplished by a spring, as in Fig. 12.

In Fig. 14 I show a modification of Fig. 13, in which the cock or valve G' is held closed by an armature, N, of an electro-magnet. When the wires which are connected with the magnets are burned or destroyed, the electric circuit is broken and the weighted arm of the cock or valve G' is released, whereby said arm falls and the cock opens, allowing the sand or material in the vessel H' to escape. The chain, cord, or connection $H^3$ of the weight may be attached to a bell, door, shutter, telephone or other alarm bell or box, or other device in the building.

Should it be desired to sound an alarm in the event of burglary or for other purposes, or the automatic release of the ball or weight fails, the tube A has a branch, P', in which a ball or weight may be dropped by hand, whereby an alarm may be sounded. (See Fig. 5.)

Having thus described my invention, what I claim as new, and desire to secure by Letters Patent, is—

1. A device of the character named, consisting of an electric circuit with fusible wires therein, an armature in said circuit, a vessel containing sand and with cock at its bottom with projecting stem sustained by said armature when circuit is open, and a weight resting on said sand and connected to and adapted to operate an alarm, substantially as described.

2. A device of the character named, consisting of the weight $H^2$, connected to and adapted to operate an alarm when lowered, a vessel containing sand on which said weight normally rests, and provided with an opening having a cock therein, the said cock having a projecting stem sustained by an armature in an electric circuit, the latter having fusible wires, said parts being combined, substantially as described.

3. A device of the character named, consisting of a detachable weight, a tube, a vessel containing sand or equivalent material and provided with an opening having a cock, the latter having a stem projecting into said tube and across the path of said detachable weight, and a second weight normally resting on the material in said vessel and connected with an alarm, said parts being combined and operated substantially as described.

4. A weight connected to and adapted to operate an alarm, a vessel containing sand, on which said weight rests and provided with an outlet, a cock controlling said outlet, a stem connected to said cock and projecting into or across the path of a detachable weight, said parts being combined and operated substantially as and for the purpose set forth.

J. FRANKLIN STUCKERT.

Witnesses:
 JOHN A. WIEDERSHEIM,
 L. DOUVILLE.